(12) United States Patent
Takaki et al.

(10) Patent No.: US 10,161,674 B2
(45) Date of Patent: Dec. 25, 2018

(54) METHOD FOR CONTROLLING A REFRIGERATOR AND REFRIGERATOR

(71) Applicant: Panasonic Intellectual Property Corporation of America, Torrance, CA (US)

(72) Inventors: Toshimasa Takaki, Osaka (JP); Ryohei Kimura, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 294 days.

(21) Appl. No.: 14/958,536

(22) Filed: Dec. 3, 2015

(65) Prior Publication Data

US 2016/0169576 A1  Jun. 16, 2016

(30) Foreign Application Priority Data

Dec. 11, 2014 (JP) ................................. 2014-251187
Jul. 24, 2015 (JP) ................................. 2015-147219

(51) Int. Cl.
| | |
|---|---|
| F25D 29/00 | (2006.01) |
| H04L 12/28 | (2006.01) |
| F25D 23/12 | (2006.01) |
| G05B 19/042 | (2006.01) |

(52) U.S. Cl.
CPC ............. *F25D 29/00* (2013.01); *F25D 23/12* (2013.01); *G05B 19/0426* (2013.01); *H04L 12/282* (2013.01); *H04L 12/2825* (2013.01); *F25D 2700/02* (2013.01); *G05B 2219/2654* (2013.01); *H04L 2012/285* (2013.01); *H04L 2012/2841* (2013.01)

(58) Field of Classification Search
None
See application file for complete search history.

(56) References Cited

U.S. PATENT DOCUMENTS

2002/0029575 A1* 3/2002 Okamoto ................ F25B 49/00
62/125
2006/0237427 A1* 10/2006 Logan ................. E05B 47/0002
219/401

(Continued)

FOREIGN PATENT DOCUMENTS

JP     2007-132551     5/2007

*Primary Examiner* — Mohammad Ali
*Assistant Examiner* — Bernard G Lindsay
(74) *Attorney, Agent, or Firm* — Greenblum & Bernstein, P.L.C.

(57) ABSTRACT

A control method is provided for controlling a refrigerator that is connected to one or more electrical apparatuses, in which the refrigerator includes a door/drawer and a processor. The control method causes the processor to sense a change in an opened state or a closed state of the door/drawer and receive state information indicating an operation state of the one or more electrical apparatuses from the one or more electrical apparatuses, which are operable when the user is. The processor determines whether the user is cooking based on the received state information, and notifies the user of different information each time a change in the opened state or the closed state is sensed if a change in the opened state or the closed state is sensed when a determination is made that the user is cooking.

17 Claims, 15 Drawing Sheets

(56) References Cited

U.S. PATENT DOCUMENTS

| | | | | |
|---|---|---|---|---|
| 2012/0260683 | A1* | 10/2012 | Cheon | F25D 29/00 62/125 |
| 2013/0338949 | A1* | 12/2013 | Jetcheva | G06Q 10/06 702/62 |
| 2014/0358287 | A1* | 12/2014 | Lee | F25D 29/00 700/275 |
| 2014/0370469 | A1* | 12/2014 | Krystek | A47L 15/0063 434/236 |
| 2015/0008216 | A1* | 1/2015 | Pippia | F24C 7/083 219/627 |
| 2016/0066744 | A1* | 3/2016 | Baxi | A47J 36/32 99/343 |

* cited by examiner

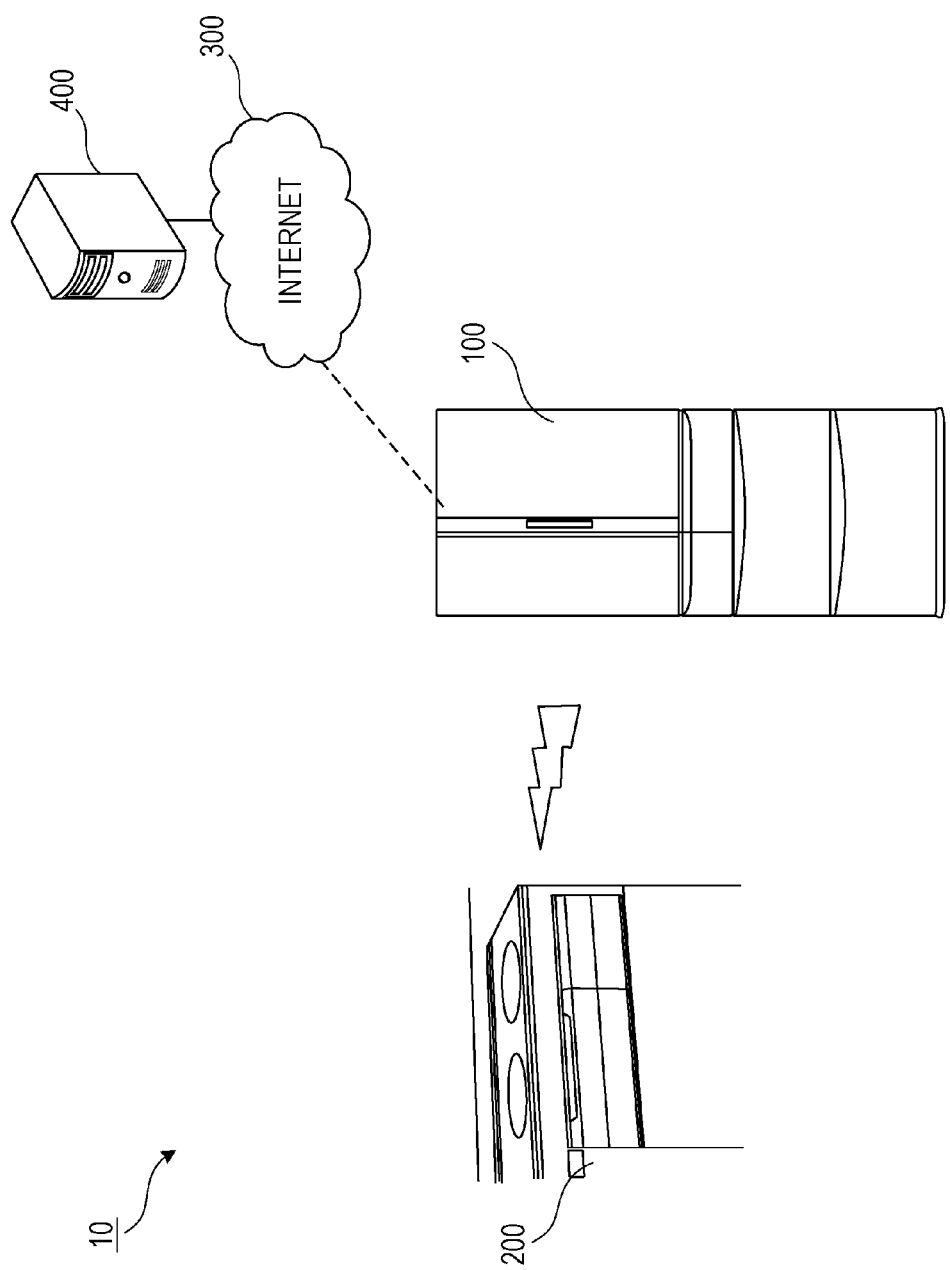

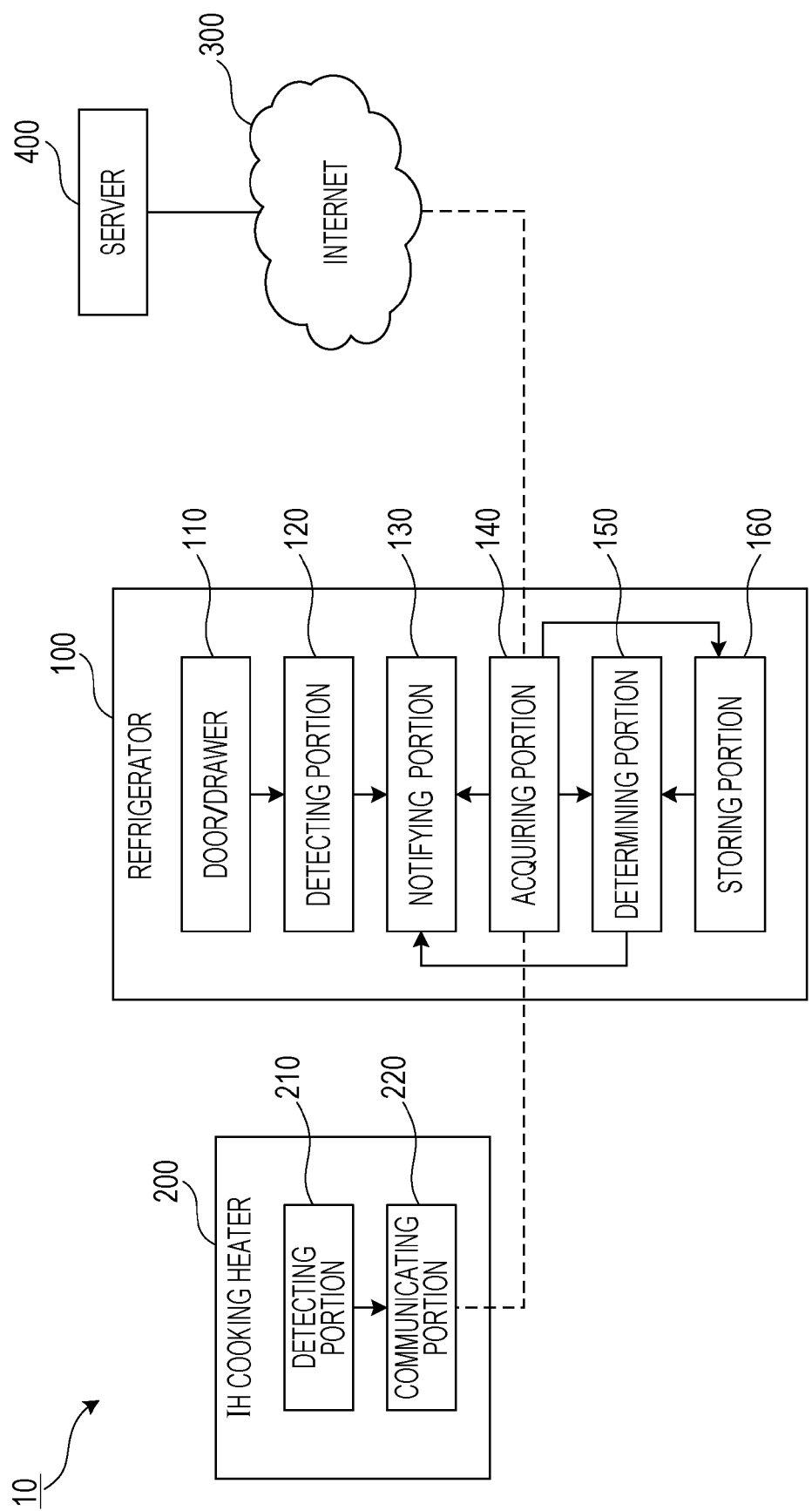

FIG. 3A

| NOTIFICATION CONDITION A | |
|---|---|
| INFORMATION TYPE | WEATHER FORECAST |
| FREQUENCY | EACH DAY |
| START TIME | 6:30 |
| END TIME | 8:30 |
| PRIORITY | 1 |

FIG. 3B

| NOTIFICATION CONDITION B | |
|---|---|
| INFORMATION TYPE | GARBAGE COLLECTION DAY |
| FREQUENCY | MONDAY |
| START TIME | 6:30 |
| END TIME | 8:30 |
| PRIORITY | 2 |

FIG. 3C

| NOTIFICATION CONDITION C | |
|---|---|
| INFORMATION TYPE | NEWS |
| FREQUENCY | EACH DAY |
| START TIME | 6:30 |
| END TIME | 8:30 |
| PRIORITY | 3 |

FIG. 3D

| NOTIFICATION CONDITION D | |
|---|---|
| INFORMATION TYPE | FORTUNETELLING |
| FREQUENCY | EACH DAY |
| START TIME | 8:00 |
| END TIME | 9:00 |
| PRIORITY | 4 |

| | COOKING PROCEDURES | EXPECTED STATE | EXPECTED TIME |
|---|---|---|---|
| PROCEDURE 1 | BOILING: OVER MEDIUM HEAT FOR 10 MINUTES | MEDIUM HEAT | 0-10 MINUTES |
| PROCEDURE 2 | PAN-FRYING: OVER HIGH HEAT FOR 5 MINUTES | HIGH HEAT | 10-15 MINUTES |
| PROCEDURE 3 | PAN-FRYING: OVER MEDIUM HEAT FOR 5 MINUTES | MEDIUM HEAT | 15-20 MINUTES |
| ... | | | |
| PROCEDURE 7 | STEWING: KEEPING IT HOT | KEEPING IT HOT | 25-40 MINUTES |

(b)

| ELAPSED TIME | OPERATION STATE |
|---|---|
| 12 MINUTES | HIGH HEAT |

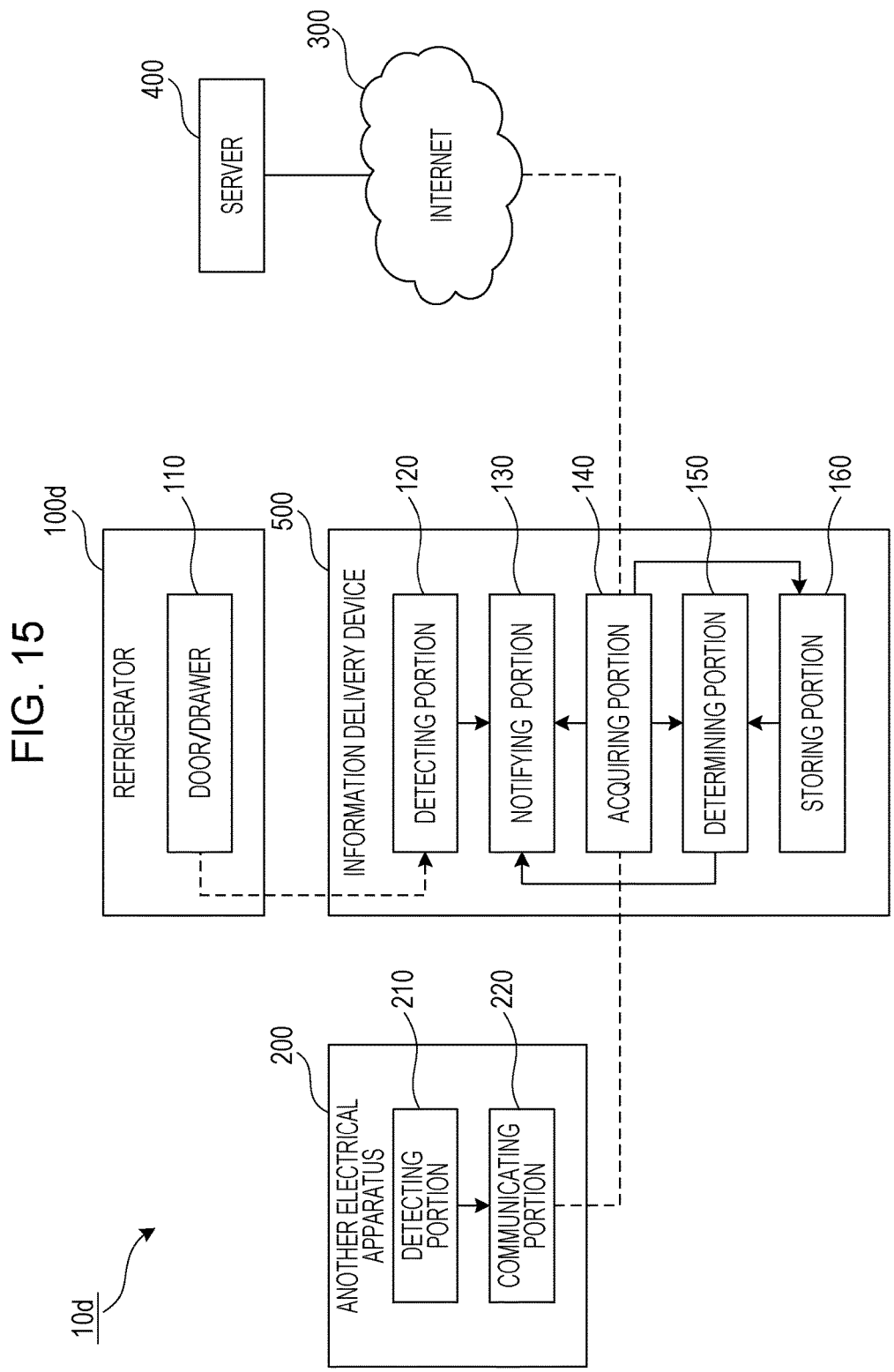

METHOD FOR CONTROLLING A REFRIGERATOR AND REFRIGERATOR

BACKGROUND

1. Technical Field

The present disclosure relates to a refrigerator that provides information to the user and a control method for controlling the refrigerator.

2. Description of the Related Art

In the past, a refrigerator that notifies the user of the data received from a personal computer (PC) with predetermined timing has been disclosed (see, for example, Japanese Unexamined Patent Application Publication No. 2007-132551). Specifically, the refrigerator described in Japanese Unexamined Patent Application Publication No. 2007-132551 notifies the user of the data received from the PC if the refrigerator senses that a door of the refrigerator is opened, an operation switch of the refrigerator is pressed, or a predetermined time has come.

SUMMARY

However, the above-described existing technique cannot provide information suitable for the user who opened and closed the refrigerator.

One non-limiting and exemplary embodiment provides a control method for controlling a refrigerator, the control method that can provide information suitable for the user who opened and closed the refrigerator.

In one general aspect, the techniques disclosed here feature a control method for controlling a refrigerator that is connected to one or more electrical apparatuses, wherein the refrigerator, comprises a processor, and includes at least one of a door and a drawer, and the control method comprising causing the processor to: sense a change in an opened state or a closed state of at least one of the door and the drawer, receive state information indicating an operation state of the one or more electrical apparatuses from the one or more electrical apparatuses, the one or more electrical apparatuses each being an electrical apparatus that is operable when a user is cooking, determine whether the user is cooking based on the received state information, and notify the user of different information each time the change in the opened state or the closed state is sensed, if the change in the opened state or the closed state is sensed when a determination is made that the user is cooking.

These general and specific aspects may be implemented using a system, a method, and a computer program, and any combination of systems, methods, and computer programs.

The control method of the present disclosure can provide information suitable for the user who opened and closed the refrigerator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a schematic diagram depicting the configuration of an information delivery system in a first embodiment;

FIG. 2 is a block diagram depicting the configuration of the information delivery system in the first embodiment;

FIG. 3A is a diagram depicting an example of the data configuration of information indicating a notification condition in the first embodiment;

FIG. 3B is a diagram depicting an example of the data configuration of information indicating a notification condition in the first embodiment;

FIG. 3C is a diagram depicting an example of the data configuration of information indicating a notification condition in the first embodiment;

FIG. 3D is a diagram depicting an example of the data configuration of information indicating a notification condition in the first embodiment;

FIG. 14 is a diagram for explaining specification processing which is performed in a specifying portion of the refrigerator according to the fourth embodiment; and FIG. 15 is a block diagram depicting the configuration of an information delivery system in a fifth embodiment.

Figure 4:
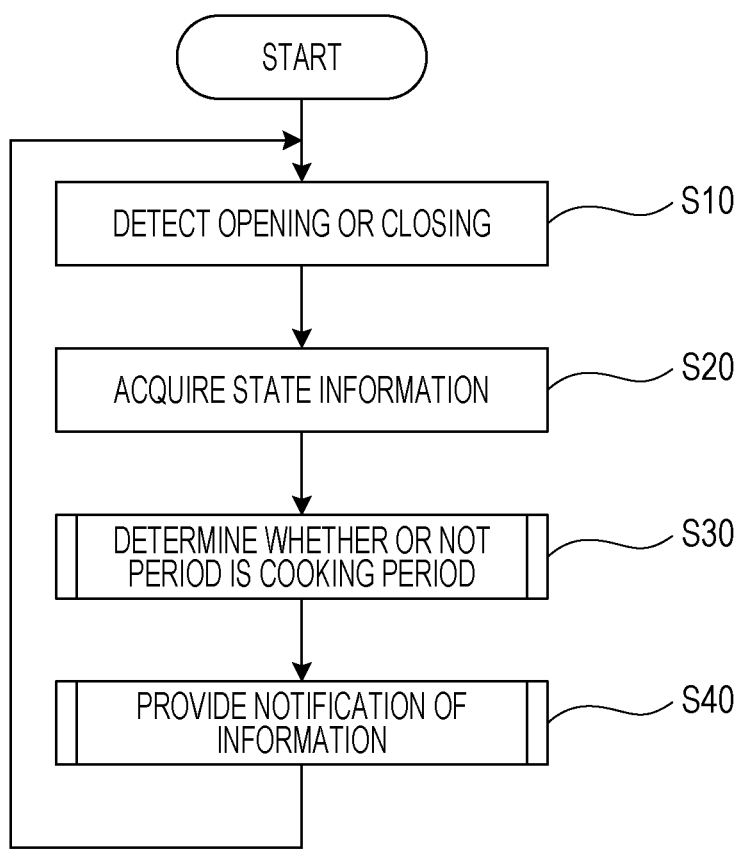
FIG. 4 is a flowchart describing processing which is performed in a refrigerator in the first embodiment.

DETAILED DESCRIPTION (Underlying Knowledge Forming Basis of the Present Disclosure)

The inventor has found the following problem in the existing refrigerator described in the "Description of the Related Art" section.

The above-described existing refrigerator cannot make a determination as to whether or not the user who opened and closed the refrigerator is the same user who opened and closed the refrigerator before. As a result, there is a possibility that the redundant information is provided to the same user. Moreover, if different information is always provided every time the refrigerator is opened or closed, even when the user who opened and closed the refrigerator is a user who is different from the user who opened and closed the refrigerator before, different information is provided. Therefore, even when each of different users desires to get, for example, a weather forecast, only one of the users can get the weather forecast. As described above, the existing refrigerator may be unable to provide information suitable for the user who opened and closed the refrigerator.

To solve such a problem, a control method according to an aspect of the present disclosure is a control method for controlling a refrigerator that is connected to one or more electrical apparatuses, wherein the refrigerator, comprises a processor, and includes at least one of a door and a drawer, and the control method comprising causing the processor to:

sense a change in an opened state or a closed state of at least one of the door and the drawer, receive state information indicating an operation state of the one or more electrical apparatuses from the one or more electrical apparatuses, the one or more electrical apparatuses each being an electrical apparatus that is operable when a user is cooking, determine whether the user is cooking based on the received state information, and notify the user of different information each time the change in the opened state or the dosed state is sensed, if the change in the opened state or the closed state is sensed when a determination is made that the user is cooking.

As a result, it is possible to prevent a notification of the same information from being provided to the user who opened or dosed at least one of the door and the drawer of the refrigerator during the cooking period. Since this makes it possible to shorten the time required for processing, it is possible to reduce the power consumption of the refrigerator.

For example, the refrigerator may be further connected to a server that stores the information of which the user is to be notified, and the control method further causes the processor to receive the information from the server.

For example, the control method may further make the computer receive a plurality of pieces of the information and order information indicating the order of notification of the plurality of pieces of the information from the server and notify the user of the different information every time the opened state or the closed state is sensed by making the computer provide a notification of the plurality of pieces of the information in order based on the order information.

For example, the control method may further causes the processor to: receive a plurality of sets of the information and priority information indicating an order of notification of the plurality of sets of the information from the server; and notify the user of the different information each time the change in the opened state or the dosed state is sensed in accordance with the priority information.

This makes it possible to determine more reliably whether or not cooking is being done.

For example, the refrigerator may be connected to a plurality of the electrical apparatuses, and the control method further causes the processor to determine whether the user is cooking based on operation states of the electrical apparatuses.

For example, the electrical apparatus may be at least one of an induction heating cooker, a lighting fixture, a ventilating fan, a microwave oven, an electric carpet, and a food processor.

As described above, by determining whether or not the period is a cooking period by using the operation state of the electrical apparatus which is used during cooking, it is possible to determine more reliably whether or not the period is a cooking period.

For example, the electrical apparatus may be an information terminal having a display, and the control method further causes the processor to determine whether the user is cooking in accordance with: if the processor receives, as the state information; first information indicating a start of displaying a recipe related to cooking on the display, a time at which the processor receives the first information as a time at which the user starts cooking if the processor receives, as the state information, second information indicating an end of the displaying the recipe on the display, a time at which the processor receives the second information as a time at which the user ends cooking.

This makes it possible to determine more reliably whether or not the period is a cooking period.

For example, the control method may causes the processor to: receive cooking steps contained in a recipe from an online site via the information terminal; specify a first cooking step of the cooking steps, the first cooking step which is being performed, based on the received state information; and notify the user of information on a second cooking step which is a step following the specified first cooking step.

As a result, since information on a cooking procedure which is performed next in cooking which is being done is provided, the user can get information on the next procedure in advance. This makes it possible to prevent the user from thinking about the next procedure with the door or the drawer of the refrigerator left open. As a result, it is possible to shorten the time for which the door or the drawer of the refrigerator is opened and reduce the power consumption of the refrigerator.

For example, the control method may further causing the processor to: identify a person who opened or closed at least one of the door and the drawer; determine whether the person identified is the user, and notify the user of the information if a determination is made that the person is the user.

As a result, since a notification of information is provided by identifying the user, it is possible to prevent a notification of the redundant information from being provided to the user more reliably. Moreover, once the user is identified, the user is regarded as one and the same person during the cooking period, which makes it possible to omit processing required for the subsequent identification. This makes it possible to reduce power consumption.

For example, the refrigerator may include a camera that takes an image of a face of the person, and the control method further causes the processor to: take an image of the face of the person using the camera; and identify the person by performing facial recognition processing on the image.

For example, the refrigerator may include a camera that takes an image of a face of the person, and the control method further causes the processor to: take an image of the face of the person using the camera; and identify the person by performing facial recognition processing on the image.

Moreover, a refrigerator according to another aspect of the present disclosure is a refrigerator including: a processor; a memory including instructions that, when executed by the processor, cause the processor to perform operations including: sensing a change in an opened state or a closed state of at least one of the door and the drawer; providing notification of information when a change in the opened state or the closed state is sensed; acquiring state information indicating an operation state of an electrical apparatus, different from the refrigerator, connected to the refrigerator, and operable when a user is cooking; and determining whether the user is cooking based on the acquired state information, wherein in the providing, notification of different information every time the sensing portion senses a change in the opened state or the closed state if the determining determines that the user is cooking and the sensing senses a change in the opened state or the closed state.

Moreover, a control method according to still another aspect of the present disclosure is a control method for controlling an information delivery apparatus that is connected to a refrigerator including at least one of a door and a drawer and one or more electrical apparatuses, each being different from the refrigerator, and configured to notify a user of information, wherein the electrical apparatuses are each an electrical apparatus operable when the user is cooking, the information delivery apparatus includes a processor, and the control method causes the processor to: receive, from the refrigerator, opening-closing information indicating a sensed change in an opened state or a closed state of at least one of the door and the drawer, receive, from the one or more electrical apparatuses, state information indicating an operation state of the one or more electrical apparatuses, determine whether or not the user is cooking based on the received state information, and notify the user of different information every time the opening-closing information is received if the opening-closing information is received when a determination is made that the user is cooking.

Incidentally, these general or specific aspects may be implemented using a system, an integrated circuit, a computer program, a computer-readable recording medium such as a CD-ROM, and any combination of a system, a device, a method, an integrated circuit, a computer program, and a recording medium.

Hereinafter, embodiments will be described specifically with reference to the drawings.

Incidentally, any embodiment which will be described below illustrates a comprehensive or specific example. The numerical values, shapes, materials, component elements, placement positions and connection configurations of the component elements, steps, order of steps, and so forth which will be described in the following embodiments are mere examples and are not meant to limit the present disclosure. Moreover, of the component elements in the following embodiments, a component element which is not described in an independent claim describing the broadest concept is described as an arbitrary component element.

(First Embodiment)

A first embodiment will be described.

First, by using FIGS. 1 and 2, the outline of the configuration of an information delivery system provided with a refrigerator in an embodiment of the present disclosure will be described.

FIG. 1 is a schematic diagram depicting the configuration of an information delivery system in the first embodiment. FIG. 2 is a block diagram depicting the configuration of the information delivery system in the first embodiment.

As depicted in FIGS. 1 and 2, an information delivery system 10 according to the first embodiment is formed of a refrigerator 100, an IH cooking heater 200 as an electrical apparatus, and a server 400 which is connected in such a way that communication is established via the Internet 300.

The refrigerator 100 provides the information acquired from the server 400 to the user by voice when a door/drawer 110 is opened or closed. The refrigerator 100 is connected to the Internet 300 in such a way that communication therewith is possible by Wi-Fi® or Ethernet®.

The IH cooking heater 200 is an apparatus which is installed in a room (space) that is the same room (space) in which the refrigerator 100 is installed, and is an electrical apparatus installed in a kitchen, for example. Incidentally, the electrical apparatus may be at least one of household electrical appliances for cooking such as a microwave oven, a food processor, and a toaster and household electrical appliances which make the kitchen comfortable such as a kitchen lighting fixture, a ventilating fan, an electric carpet, kitchen floor heating, an air conditioner, and an electric heater. Moreover, it is preferable that the household electrical appliance for cooking is an apparatus which requires the presence of the user near the apparatus while the apparatus is being used, but, in addition to those described above, the household electrical appliances for cooking may include an electric rice cooker, an electric kettle, an automatic bread making machine, and so forth. The IH cooking heater 200 can perform communication with the refrigerator 100 by wireless connection such as Wi-Fi® or Bluetooth®.

The server 400 provides, via the Internet 300, information of which the user is to be notified.

Next, the specific configuration of the refrigerator 100 will be described.

The refrigerator 100 includes the door/drawer 110, a detecting portion 120, a notifying portion 130, an acquiring portion 140, a determining portion 150, and a storing portion 160.

The door/drawer 110 is at least one of a door that covers an opening of a storage chamber in such a way that the opening can be opened and closed thereby and a drawer that can slide between the storage chamber and a space outside the storage chamber. As a result of the door/drawer 110 being opened and closed, switching between an opened state in which the storage chamber of the refrigerator 100 is opened and a closed state in which the storage chamber of the refrigerator 100 is made airtight takes place. As a result of the door/drawer 110 being brought into an opened state by the user, the door/drawer 110 allows the user to take an article stored in the storage chamber out of the storage chamber or store an article in the storage chamber.

The detecting portion 120 detects the opened state or the closed state of the door/drawer 110. Specifically, the detecting portion 120 detects that the door/drawer 110 has changed from the closed state to the opened state and transmits a signal indicating the detection to the notifying portion 130. Incidentally, since the refrigerator 100 is normally in a state in which the door/drawer 110 is closed, it is preferable that the detecting portion 120 detects that the door/drawer 110 has transitioned from the closed state to the opened state; however, the detecting portion 120 may detect that the door/drawer 110 has transitioned from the opened state to the closed state or may detect both of the above-described two patterns of transition. Incidentally, in the following description, a transition from the opened state to the closed state, a transition from the closed state to the opened state, or both of these two patterns of transition will be referred to also as "opening and closing" the door/drawer 110. The detecting portion 120 is implemented by, for example, a sensor such as a photo interrupter.

The notifying portion 130 provides a notification when the opened state or the closed state of the door/drawer 110 is detected by the detecting portion 120. Specifically, the notifying portion 130 notifies the user of the information by outputting voice from a speaker when the opened state or the closed state is detected. The notifying portion 130 provides a notification of life information such as a weather forecast, a schedule of each user (family members including the user), and a garbage collection schedule of an area in which the refrigerator 100 is installed.

Moreover, if the opened state or the closed state of the door/drawer 110 is detected by the detecting portion 120 during a cooking period which will be described later, the notifying portion 130 provides a predetermined notification made by regarding the user who opened or closed the door/drawer 110 during the cooking period as one and the same person. That is, if the opened state or the closed state of the door/drawer 110 is detected by the detecting portion 120 multiple times during the cooking period, the notifying portion 130 regards the user who opened or closed the door/drawer 110 multiple times as one and the same person. In other words, here, since it is possible to assume that the user who opens or closes the door/drawer 110 of the refrigerator 100 during the same cooking period is one and the same person, the notifying portion 130 provides a notification made by regarding the user who opens or closes the door/drawer 110 as one and the same person.

For example, if the opened state or the closed state is detected during the cooking period, the notifying portion 130 provides a predetermined notification by providing a notification of different information every time the door/drawer 110 is opened or dosed.

Here, a notification method by which a notification of different information is provided every time the door/drawer 110 is opened or dosed will be described specifically. The following description deals with a case in which information whose notification is provided by the notifying portion 130 is treated as notification information for the sake of explanation.

FIGS. 3A to 3D are each a diagram depicting an example of the data configuration of information indicating a notification condition in the first embodiment.

The acquiring portion 140 acquires in advance information indicating notification conditions depicted in FIGS. 3A to 3D, the notification conditions including items: "information type", "frequency", "start time", "end time", and "priority", from the server 400. The information indicating the notification conditions is stored in the storing portion 160, for example.

The item "information type" indicates the type of notification information, and, for example, a weather forecast, a garbage collection day, news, fortunetelling, or the like is entered. The notification condition to be applied is determined depending on the information type of the notification information which is separately acquired from the server 400 by the acquiring portion 140. For example, if the information type of notification information is a weather forecast, a notification condition A is applied. Moreover, for example, if the information type of notification information is news, a notification condition C is applied.

The item "frequency" indicates the frequency with which a notification of the notification information is provided. Based on the information entered in this item, a date on which a notification of the corresponding notification information is provided is determined.

The item "start time" indicates a start time of a time period in which notification of the notification information is provided. The item "end time" indicates an end time of the time period in which a notification of the notification information is provided. For example, a notification of the notification information, to which a notification condition in which "start time" is 6:30 and "end time" is 8:30 is applied, is provided if the opened state or the closed state of the door/drawer 110 is detected between 6:30 and 8:30 inclusive. That is, if the opened state or the closed state of the door/drawer 110 is detected at 9:00, a notification of the notification information is not provided. However, as in a notification condition D, if there is notification information corresponding to a notification condition including 9:00 in the time period in which a notification of the notification information is provided, a notification of the notification information is provided.

The item "priority" indicates a priority assigned to a notification of the notification information that matches each notification condition. Here, it is assumed that the smaller a numerical value entered here, the higher a priority. For example, the notification condition A and the notification condition C have the same "frequency", "start time", and "end time", but a higher priority is assigned to the notification condition A. Therefore, for example, if the opened state or the closed state of the door/drawer 110 is detected at 8:00, a notification of a weather forecast corresponding to the notification condition A is provided. Moreover, if the opened state or the closed state of the door/drawer 110 is detected twice between 6:30 and 8:30 inclusive while it is determined that it is during the same cooking period, a notification of a weather forecast corresponding to the notification condition A is provided at the time of the first detection and a notification of news corresponding to the notification condition C is provided at the time of the second detection. Furthermore, if it is Monday, at the time of the first detection, a notification of a weather forecast corresponding to the notification condition A is provided as in the case described above, but, at the time of the second detection, a notification of information on a garbage collection day corresponding to a notification condition B to which a higher priority is assigned than the notification condition C is provided.

The notification information contains specific contents of a notification and data indicating the information type of the notification information. The contents of a notification may be, for example, text information such as "It is sunny today." and a notification by voice may be implemented by performing voice synthesis in the notifying portion 130 based on this text information. Moreover, in place of the text information, voice information may be contained therein. A notification by voice may be implemented in the notifying portion 130 based on this voice information. Furthermore, based on data indicating the information type of the notification information, in the determining portion 150 which will be described later, a determination about the notification condition to which the notification information corresponds is made and notification information whose notification is actually provided is determined. The determining portion 150 may determine the notification information whose notification is to be provided by referring to the notification conditions and the notification information which are stored in the storing portion 160.

At this time, the acquiring portion 140 may acquire a plurality of pieces of notification information from the server 400 in advance or may acquire the notification information by making an inquiry at the server 400 when the opened state or the dosed state of the door/drawer 110 is detected.

On the other hand, the notifying portion 130 randomly provides a notification of predetermined information repeatedly during a period other than the cooking period. The notifying portion 130 is implemented by, for example, a processor, memory in which a program is stored, a speaker, and so forth.

Incidentally, the cooking period in which a predetermined notification is provided in this case is one consecutive period. That is, if there are a plurality of cooking periods, the notifying portion 130 provides a predetermined notification made by regarding the user as one and the same person in each cooking period because the user who is regarded as one and the same person in a first cooking period of the plurality of cooking periods is sometimes different from the user who is regarded as one and the same person in a second cooking period.

The acquiring portion 140 acquires state information indicating the operation state of the IH cooking heater 200. Specifically, the acquiring portion 140 acquires information indicating the ON/OFF state of a power supply of the IH cooking heater 200, for example, as the state information. Moreover, the acquiring portion 140 may acquire information indicating the heating state of the IH cooking heater 200, for example, as the state information. That is, the acquiring portion 140 acquires information indicating whether or not an operation for cooking is being performed as the state information of the IH cooking heater 200.

Furthermore, the acquiring portion 140 acquires, from the server 400, information whose notification is to be provided by the notifying portion 130. Specifically, the acquiring portion 140 acquires the above-described life information. The acquiring portion 140 is implemented by, for example, a processor, memory in which a program is stored, a communication module, and so forth. That is, the acquiring portion 140 acquires various types of information by wireless communication which is established by wireless connection such as Wi-Fi® or Bluetooth® or wire communication which is established by wire connection such as Ethernet®.

The determining portion 150 determines whether or not the period is a cooking period in which cooking is being done by using the IH cooking heater 200 based on the state information acquired by the acquiring portion 140. Specifically, the determining portion 150 determines whether or not the period is a cooking period by determining that the cooking period has started if the operation of the IH cooking heater 200 is started and determining that the cooking period has ended if the operation of the IH cooking heater 200 is ended or a predetermined time has elapsed after the end of the operation of the IH cooking heater 200. Incidentally, the determining portion 150 determines the start or end of the operation of the IH cooking heater 200 based on the ON/OFF state of a power supply, the heating state, and so forth. The determining portion 150 is implemented by, for example, a processor, memory in which a program is stored, a communication module, and so forth.

The storing portion 160 stores the information indicating the notification condition and the notification information, the information and the notification information acquired by the acquiring portion 140 from the server 400. The storing portion 160 is implemented by, for example, memory, a hard disk, or the like.

Incidentally, in the embodiment described above, an example in which a determination as to whether or not the period is a cooking period is made based only on the operation of the IH cooking heater 200 has been described, but it may be determined that the period is a cooking period based on the operations of the IH cooking heater 200 and another electrical apparatus which is not depicted in the drawing. For example, it may be determined that the cooking period has started if the operations of both the IH cooking heater 200 and the other electrical apparatus are started. Moreover, it may be determined that the cooking period has ended if a state has changed from a state in which both the IH cooking heater 200 and the other electrical apparatus are operating to a state in which the operations of both the IH cooking heater 200 and the other electrical apparatus are ended or a predetermined time has elapsed after the end of the operations of both the IH cooking heater 200 and the other electrical apparatus. Furthermore, it may be determined that the cooking period has ended if a state has changed from a state in which both the IH cooking heater 200 and the other electrical apparatus are operating to a state in which the operation of any one of the IH cooking heater 200 and the other electrical apparatus is ended or a predetermined time has elapsed after the end of the operation of any one of the IH cooking heater 200 and the other electrical apparatus. As described above, a determination as to whether or not the period is a cooking period may be made by determining the start and the end of the cooking period.

Here, the other electrical apparatus is, for example, a ventilating fan, a kitchen lighting fixture to illuminate user's hands, a heater installed in the kitchen, a cooking scale, an activity amount meter, a tap, or the like. Furthermore, the other electrical apparatus may be a smartphone, a tablet, or the like. If the smartphone or the tablet is used as the other electrical apparatus, it is determined that the other electrical apparatus (the smartphone or the tablet) is operating if it is determined that the user is viewing a cooking recipe by viewing a website or executing an application.

The IH cooking heater 200 includes a detecting portion 210 and a communicating portion 220.

The detecting portion 210 detects the operation state of the IH cooking heater 200 and outputs the state information indicating the detected operation state to the communicating portion 220. Since the operation state which is detected by the detecting portion 210 is the same as the operation state which is acquired by the acquiring portion 140, the explanation thereof is omitted.

The communicating portion 220 transmits the state information output from the detecting portion 210 to the refrigerator 100 by wireless communication such as Wi-Fi® or Bluetooth®.

The server 400 is an information delivery server that delivers information such as a weather forecast and news and delivers information in response to a request transmitted from the acquiring portion 140 of the refrigerator 100.

Next, information delivery processing which is performed in the refrigerator 100 will be described.

FIG. 4 is a flowchart describing the information delivery processing which is performed in the refrigerator in the first embodiment.

First, the detecting portion 120 detects whether or not opening or closing of the refrigerator 100 is performed (S10).

Next, the acquiring portion 140 acquires the state information indicating the operation state of the IH cooking heater 200 (S20).

Then, the determining portion 150 determines whether or not the period is a cooking period in which cooking is being done by using the IH cooking heater 200 based on the state information thus acquired (S30). Incidentally, the details of the determination processing which is performed by the determining portion 150 will be described later.

Then, the notifying portion 130 notifies the user of the information in response to the determination result (S40). Incidentally, the details of the notification processing which is performed by the notifying portion 130 will be described later.

Next, the details of the determination processing in step S30 described in FIG. 4 will be described.

Figure 5:
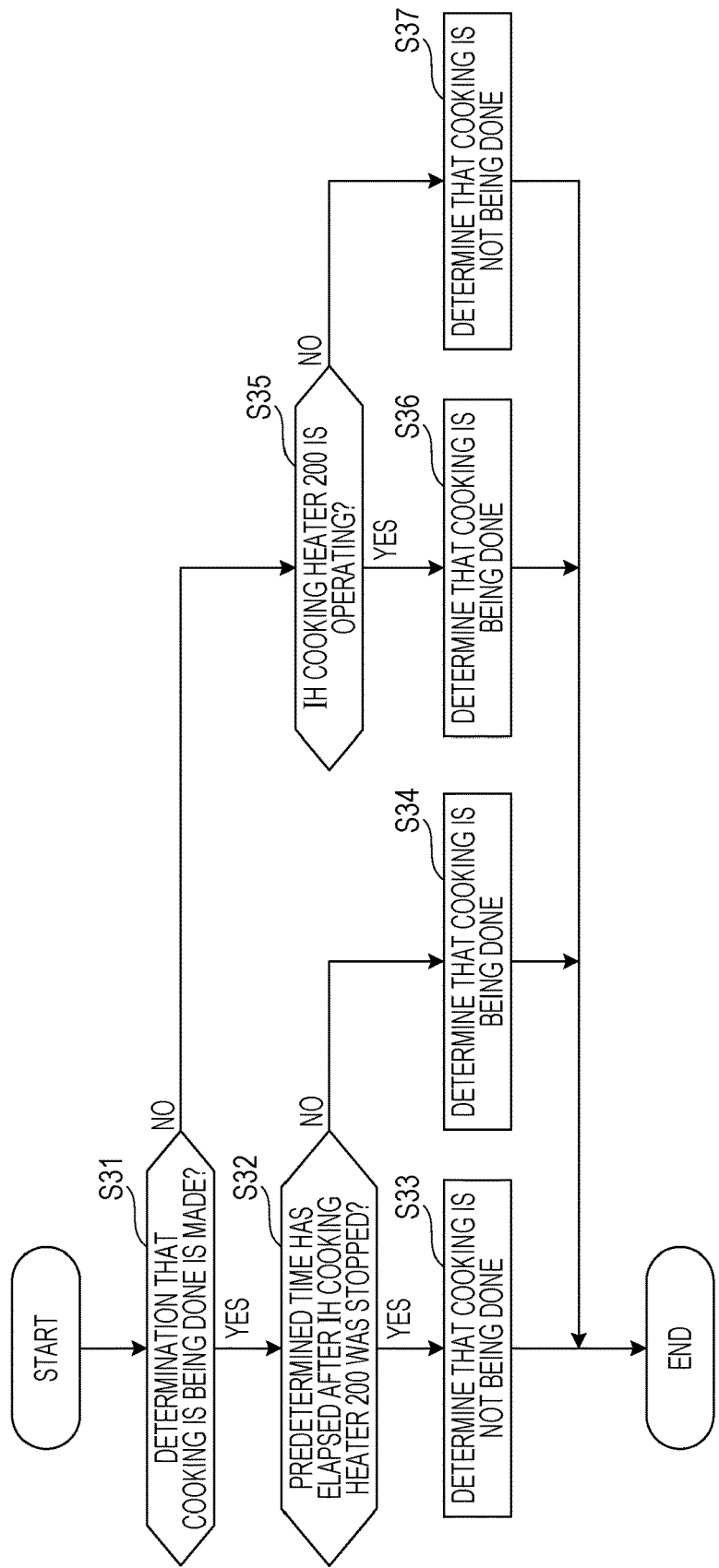
FIG. 5 is a flowchart describing the details of determination processing in the first embodiment.

FIG. 5 is a flowchart describing the details of the determination processing in the first embodiment.

First, the determining portion 150 determines whether or not the state is a state for which a determination that cooking is being done is made (S31). Specifically, the determining portion 150 determines that the state is a state for which a determination that cooking is being done is made if a flag indicating whether or not cooking is being done indicates that cooking is being done, and determines that the state is not a state for which a determination that cooking is being done is made if the flag indicates that cooking is not being done. Incidentally, for example, the flag is "1" if cooking is being done and is "0" if cooking is not being done.

If the determining portion 150 determines that the state is a state for which a determination that cooking is being done is made (Yes in S31), the determining portion 150 determines whether or not a predetermined time has elapsed after the IH cooking heater 200 was stopped (S32).

If the determining portion 150 determines that a predetermined time has elapsed after the IH cooking heater 200 was stopped (Yes in S32), the determining portion 150 determines that cooking is not being done (S33). Specifically, the determining portion 150 determines that cooking is not being done in this case (Yes in S32) and sets the above-described flag such that the flag indicates that cooking is not being done. That is, the determining portion 150 changes the numerical value representing the flag from "1" to "0" and determines that the cooking period has ended.

On the other hand, if the determining portion 150 determines that a predetermined time has not elapsed after the IH cooking heater 200 was stopped (No in S32), the determining portion 150 determines that cooking is being done (S34). Specifically, the determining portion 150 determines that cooking is being done in this case (No in S32) and sets the above-described flag such that the flag indicates that cooking is being done. That is, the determining portion 150 makes the numerical value representing the flag remain at "1" (does not change the numerical value).

Moreover, if the determining portion 150 determines that the state is not a state for which a determination that cooking is being done is made (No in S31), the determining portion 150 determines whether or not the IH cooking heater 200 is operating (S35).

If the determining portion 150 determines that the IH cooking heater 200 is operating (Yes in S35), the determining portion 150 determines that cooking is being done (S36). Specifically, the determining portion 150 determines that cooking is being done in this case (Yes in S32) and sets the above-described flag such that the flag indicates that cooking is being done. That is, the determining portion 150 changes the numerical value representing the flag from "0" to "1" and determines that the cooking period has started.

On the other hand, if the determining portion 150 determines that the H cooking heater 200 is not operating (No in S35), the determining portion 150 determines that cooking is not being done (S37). Specifically, the determining portion 150 determines that cooking is not being done in this case (No in S35) and sets the above-described flag such that the flag indicates that cooking is not being done. That is, the determining portion 150 makes the numerical value representing the flag remain at "0" (does not change the numerical value).

By ending the processing in any one of steps S33 to S37, the determining portion 150 ends the determination processing in step S30.

Next, the details of the notification processing in step S40 described in FIG. 4 will be described.

Figure 6:
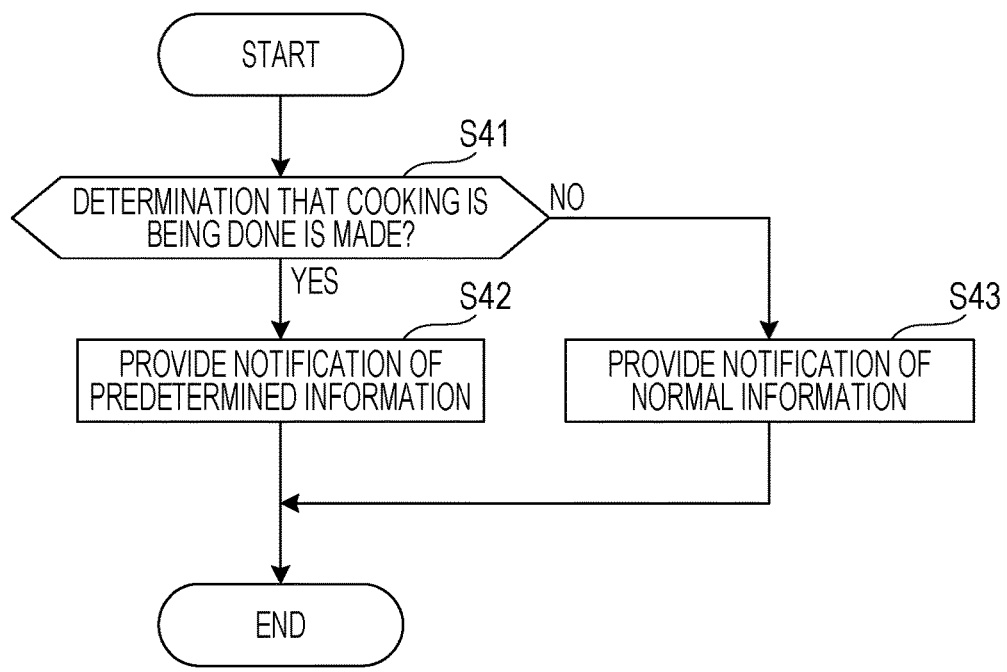
FIG. 6 is a flowchart describing the details of notification processing in the first embodiment.

FIG. 6 is a flowchart describing the details of the notification processing in the first embodiment.

First, the notifying portion 130 determines whether or not it is determined by the determining portion 150 that cooking is being done (S41). Specifically, as in step S31 described above, the notifying portion 130 determines that the state is a state for which a determination that cooking is being done is made if the flag indicating whether or not cooking is being done indicates that cooking is being done and determines that the state is not a state for which a determination that cooking is being done is made if the flag indicates that cooking is not being done.

Then, if the notifying portion 130 determines that the state is a state for which a determination that cooking is being done is made (Yes in S41), the notifying portion 130 provides a notification of predetermined information (S42). Specifically, the notifying portion 130 determines that the period is a cooking period in this case (Yes in S41) and provides a predetermined notification made by regarding the user who opened or closed the door/drawer 110 as one and the same person.

On the other hand, if the notifying portion 130 determines that the state is not a state for which a determination that cooking is being done is made (No in S41) the notifying portion 130 provides a notification of normal information (S43). Specifically, the notifying portion 130 determines that the period is not a cooking period in this case (No in S41) and provides a notification made by not regarding the user who opened or closed the door/drawer 110 as one and the same person.

As described above, according to this embodiment, since a predetermined notification made by regarding the user who opened or closed the door/drawer 110 of the refrigerator 100 as one and the same person is provided during the cooking period, it is possible to prevent the redundant processing from being performed on the same user. This makes it possible to reduce the power consumption of the refrigerator 100.

Moreover, according to this embodiment, if the opened state or the closed state of the door/drawer 110 of the refrigerator 100 is detected during the cooking period, a predetermined notification is provided by providing a notification of different information every time the door/drawer 110 is opened or closed. As a result, it is possible to prevent a notification of the same information from being provided to the user during the cooking period.

Furthermore, according to this embodiment, the determining portion 150 determines whether or not the period is a cooking period by determining that the cooking period has started if the operation of the IH cooking heater 200 is started and determining that the cooking period has ended if a predetermined time has elapsed after the end of the operation of the IH cooking heater 200. This makes it possible to determine more reliably whether or not cooking is being done.

Moreover, according to this embodiment, the acquiring portion 140 acquires, as the state information of the IH cooking heater 200, the state information indicating the operation state of at least one of the IH cooking heater, the lighting fixture, the ventilating fan, the microwave oven, the electric carpet, and the food processor. As described above, by determining whether or not the period is a cooking period by using the operation state of the electrical apparatus which is used during cooking, it is possible to determine more reliably whether or not the period is a cooking period.

(Second Embodiment)

Next, a second embodiment will be described.

Figure 7:
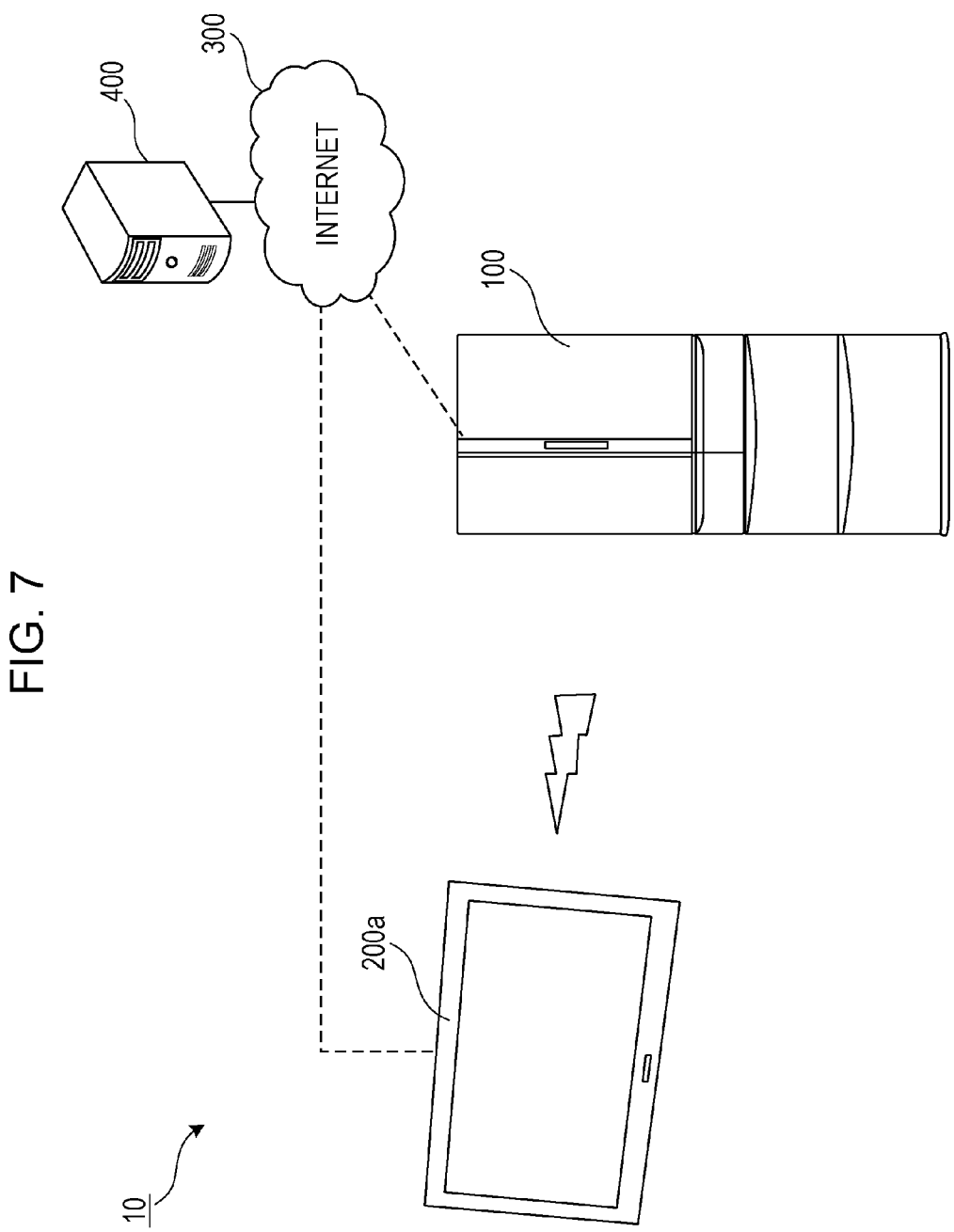
FIG. 7 is a schematic diagram depicting the configuration of an information delivery system in a second embodiment.
Figure 8:
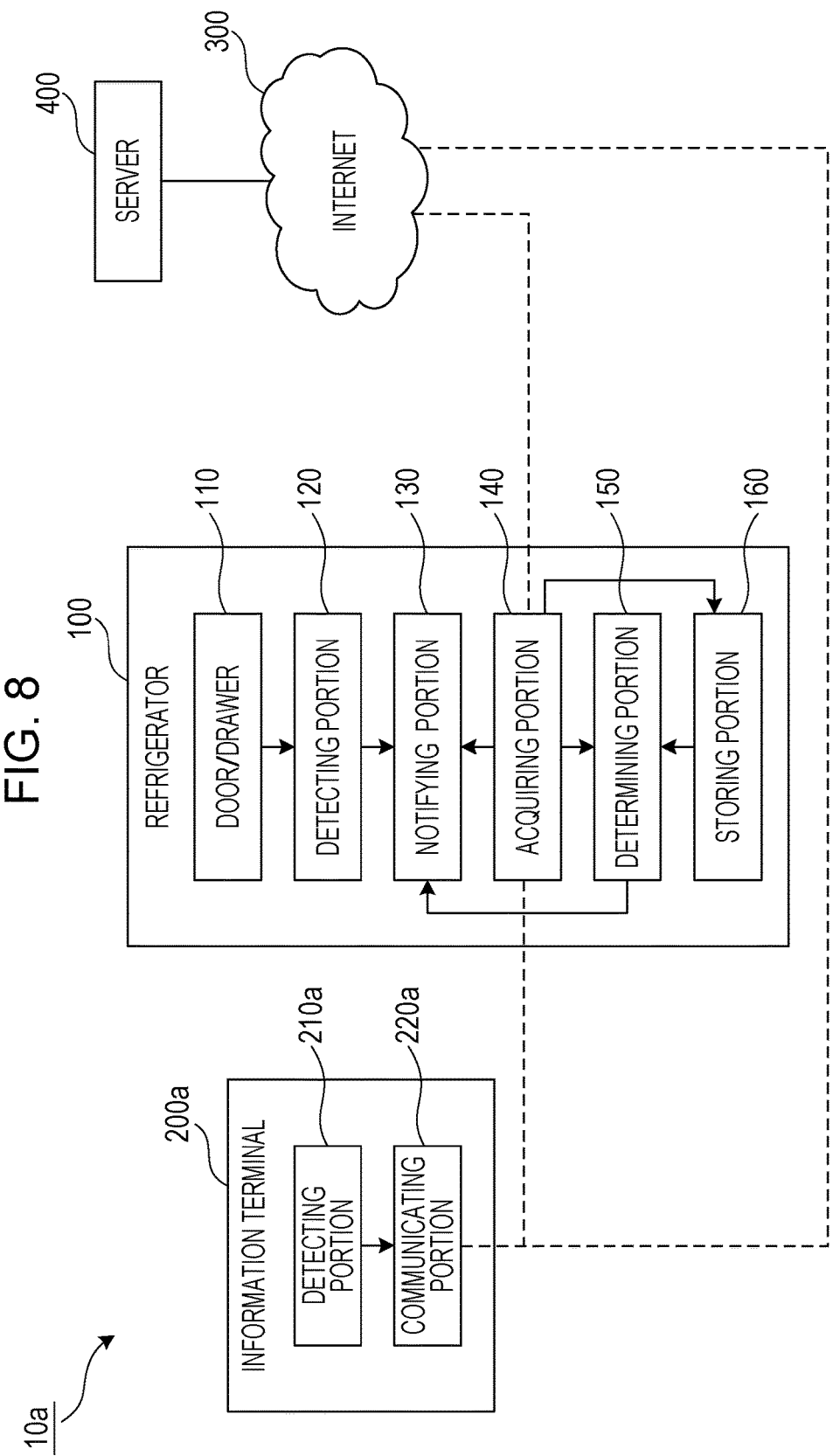
FIG. 8 is a block diagram depicting the configuration of the information delivery system in the second embodiment.

FIG. 7 is a schematic diagram depicting the configuration of an information delivery system in the second embodiment. FIG. 8 is a block diagram depicting the configuration of the information delivery system in the second embodiment.

An information delivery system 10a according to the second embodiment differs from the information delivery system 10 according to the first embodiment in that the other electrical apparatus is an information terminal 200a. Moreover, the information delivery system 10a according to the second embodiment differs from the information delivery system 10 according to the first embodiment in the state information of the information terminal 200a, the state information which is acquired by the acquiring portion 140 of the refrigerator 100. Furthermore, the information delivery system 10a according to the second embodiment differs from the information delivery system 10 according to the first embodiment in the contents of the determination processing which is performed by the determining portion 150 of the refrigerator 100.

Hereinafter, only the configuration which is different from the configuration of the refrigerator 100 of the first embodiment will be described.

The information terminal 200a is a smartphone, a tablet computer, a laptop computer, or the like and is connected to the server 400 via the Internet 300 by wireless communication which is established by wireless connection such as Wi-Fi®, Bluetooth®, or a cellular telephone communication network. As is the case with the first embodiment, the information terminal 200a includes a detecting portion 210a detecting the operation state and a communicating portion 220a.

The detecting portion 210a detects whether or not a recipe site is being viewed on the information terminal 200a. That is, the detecting portion 210a detects whether or not the recipe site is being output to an unillustrated display portion. The detecting portion 210a outputs the state information indicating the result of detection to the communicating portion 220a. Incidentally, here, the recipe site is a web site that releases information on a recipe describing ingredients (including quantities thereof for a predetermined number of people) which are used in cooking, cooking utensils, a time required for cooking, cooking procedures, and so forth.

The communicating portion 220a transmits, to the refrigerator 100, the state information output to the detecting portion 210a by wireless communication such as Wi-Fi® or Bluetooth®.

Then, the determining portion 150 of the refrigerator 100 determines whether or not the period is a cooking period by determining whether or not a recipe for cooking is being viewed by using the information terminal 200a based on the state information acquired by the acquiring portion 140. Specifically, the determining portion 150 determines whether or not the period is a cooking period by determining that the cooking period has started if the information terminal 200a starts display of the recipe site and determining that the cooking period has ended if the information terminal 200a ends the display of the recipe site.

Next, information delivery processing which is performed in the refrigerator 100 according to the second embodiment will be described.

In the second embodiment, since only part of the determination processing thereof is different from the determination processing of the first embodiment and the other processing is the same, only the different part will be explained and explanations of the other processing will be omitted.

Figure 9:
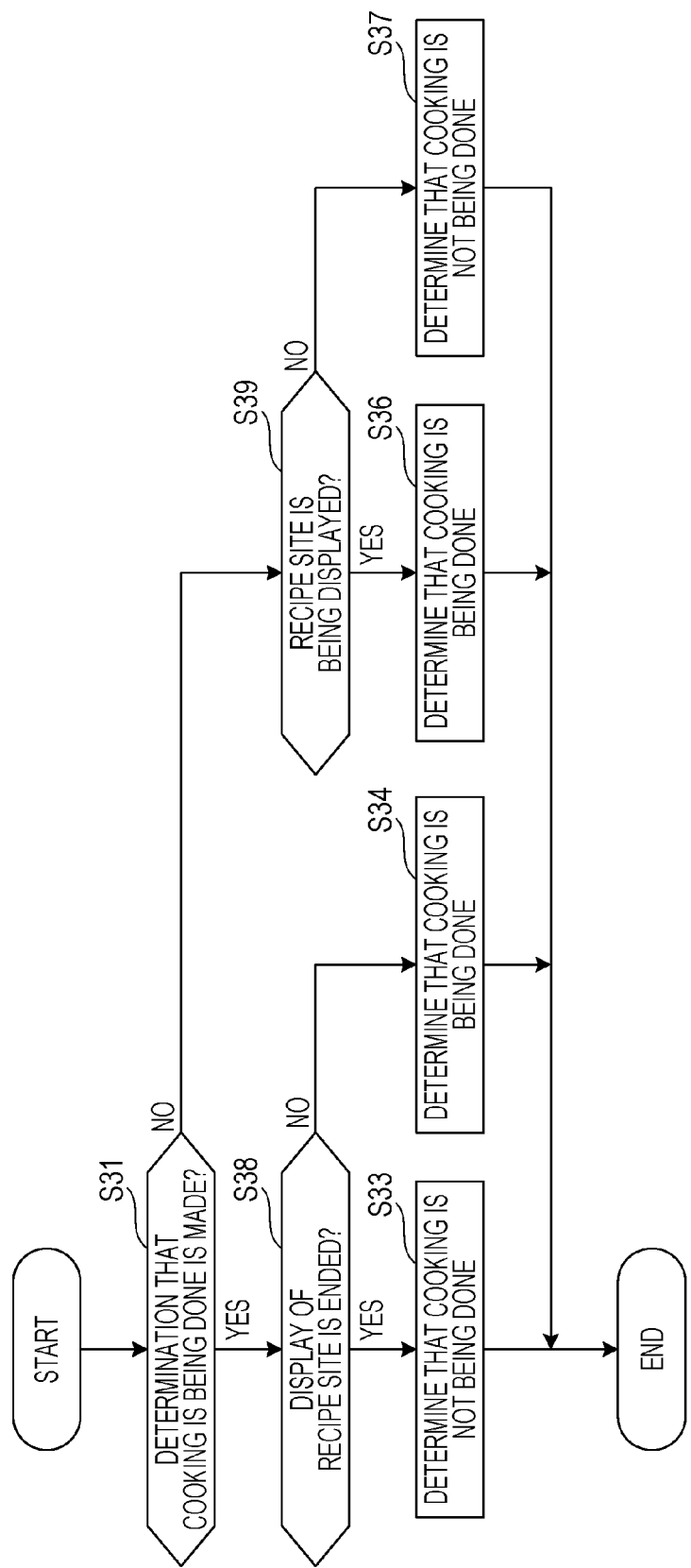
FIG. 9 is a flowchart describing the details of determination processing in the second embodiment.

FIG. 9 is a flowchart describing the details of the determination processing in the second embodiment.

In the determination processing of the second embodiment, in place of step S32 and step S35 of the determination processing of the first embodiment, step S38 and step S39 are performed, respectively. Hereinafter, a specific description will be given.

If the determining portion 150 determines that the state is a state for which a determination that cooking is being done is made (Yes in S31), the determining portion 150 determines whether or not the display of the recipe site on the information terminal 200a is ended (S38).

If the determining portion 150 determines that the display of the recipe site on the information terminal 200a is ended (Yes in S38), the determining portion 150 determines that cooking is not being done (S33). Specifically, the determining portion 150 determines that cooking is not being done in this case (Yes in S38) and sets the above-described flag such that the flag indicates that cooking is not being done. That is, the determining portion 150 changes the numerical value representing the flag from "1" to "0" and determines that the cooking period has ended.

On the other hand, if the determining portion 150 determines that the recipe site is being displayed on the information terminal 200a (No in S38), the determining portion 150 determines that cooking is being done (534). Specifically, the determining portion 150 determines that cooking is being done in this case (No in S38) and sets the above-described flag such that the flag indicates that cooking is being done. That is, the determining portion 150 makes the numerical value representing the flag remain at "1" (does not change the numerical value).

Moreover, if the determining portion 150 determines that the state is not a state for which a determination that cooking is being done is made (No in S31), the determining portion 150 determines whether or not the recipe site is being displayed on the information terminal 200a (S39).

If the determining portion 150 determines that the recipe site is being displayed on the information terminal 200a (Yes in S39), the determining portion 150 determines that cooking is being done (S36). Specifically, the determining portion 150 determines that cooking is being done in this case (Yes in S39) and sets the above-described flag such that the flag indicates that cooking is being done. That is, the determining portion 150 changes the numerical value representing the flag from "0" to "1" and determines that the cooking period has started.

On the other hand, if the determining portion 150 determines that the information terminal 200a is not operating (No in S39), the determining portion 150 determines that cooking is not being done (S37). Specifically, the determining portion 150 determines that cooking is not being done in this case (No in S39) and sets the above-described flag such that the flag indicates that cooking is not being done. That is, the determining portion 150 makes the numerical value representing the flag remain at "0" (does not change the numerical value).

As described above, according to this embodiment, the determining portion 150 determines whether or not the period is the cooking period by determining that the cooking period has started if the information terminal 200a starts display of the recipe site and determining that the cooking period has ended if the information terminal 200a ends the display of the recipe site. This makes it possible to determine more reliably whether or not cooking is being done.

(Third Embodiment)

Next, a third embodiment will be described.

Figure 10:
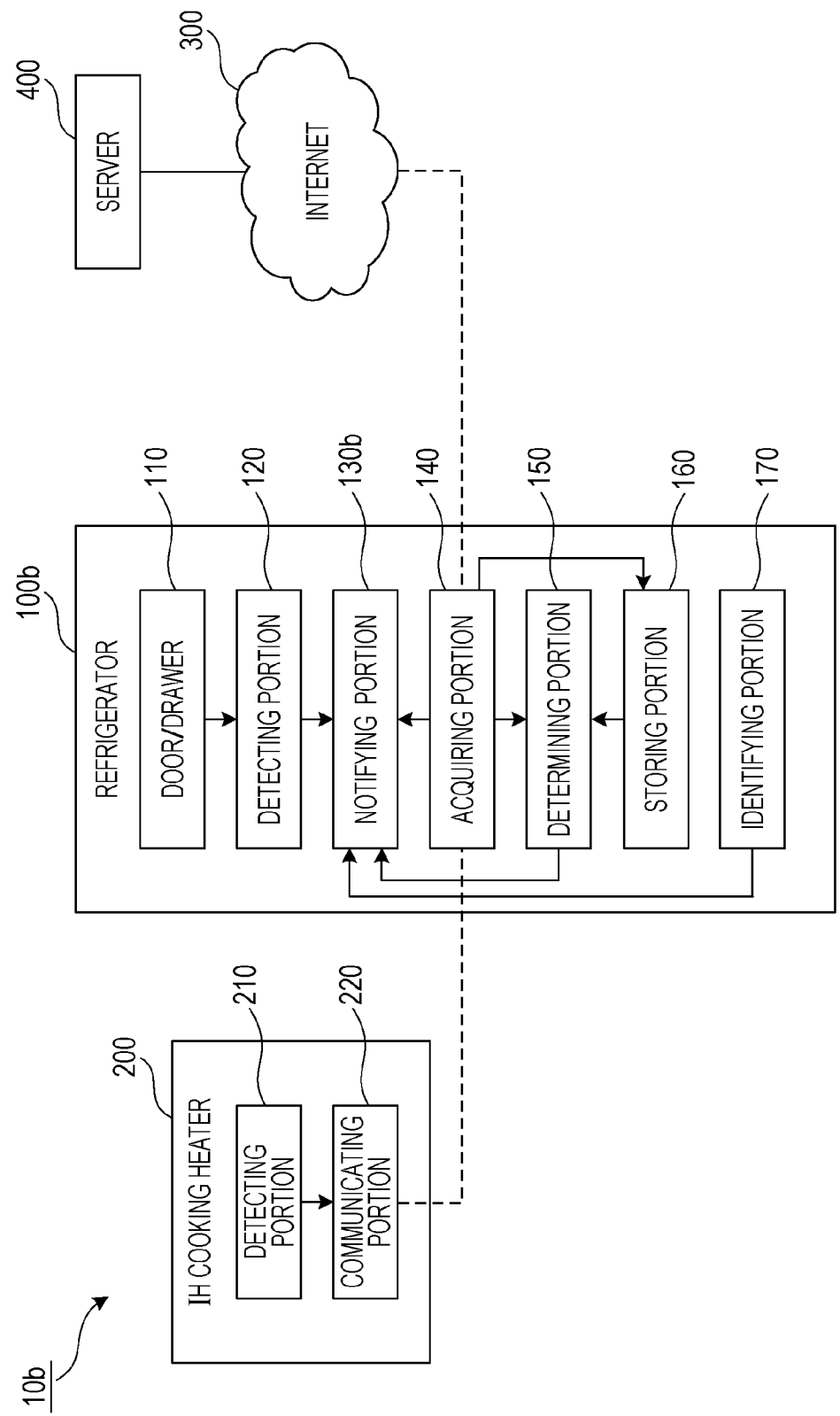
FIG. 10 is a block diagram depicting the configuration of an information delivery system in a third embodiment.

FIG. 10 is a block diagram depicting the configuration of an information delivery system 10b in the third embodiment.

The information delivery system 10b according to the third embodiment differs from the information delivery system 10 according to the first embodiment in the configuration of a refrigerator 100b. Specifically, the refrigerator 100b includes an identifying portion 170 in addition to the configuration of the refrigerator 100. Moreover, unlike the notifying portion 130 of the refrigerator 100, a notifying portion 130b of the refrigerator 100b provides a notification by using the determination result of the determining portion 150 and the identification result of the identifying portion 170. Since the other configuration of the refrigerator 100b is the same as the configuration of the refrigerator 100, the explanation thereof will be omitted.

Hereinafter, only the configuration which is different from the configuration of the refrigerator 100 of the first embodiment will be described.

The identifying portion 170 identifies the user who opened and closed the door/drawer 110 of the refrigerator 100b.

Next, information delivery processing which is performed in the refrigerator 100b according to the third embodiment will be described.

Figure 11:
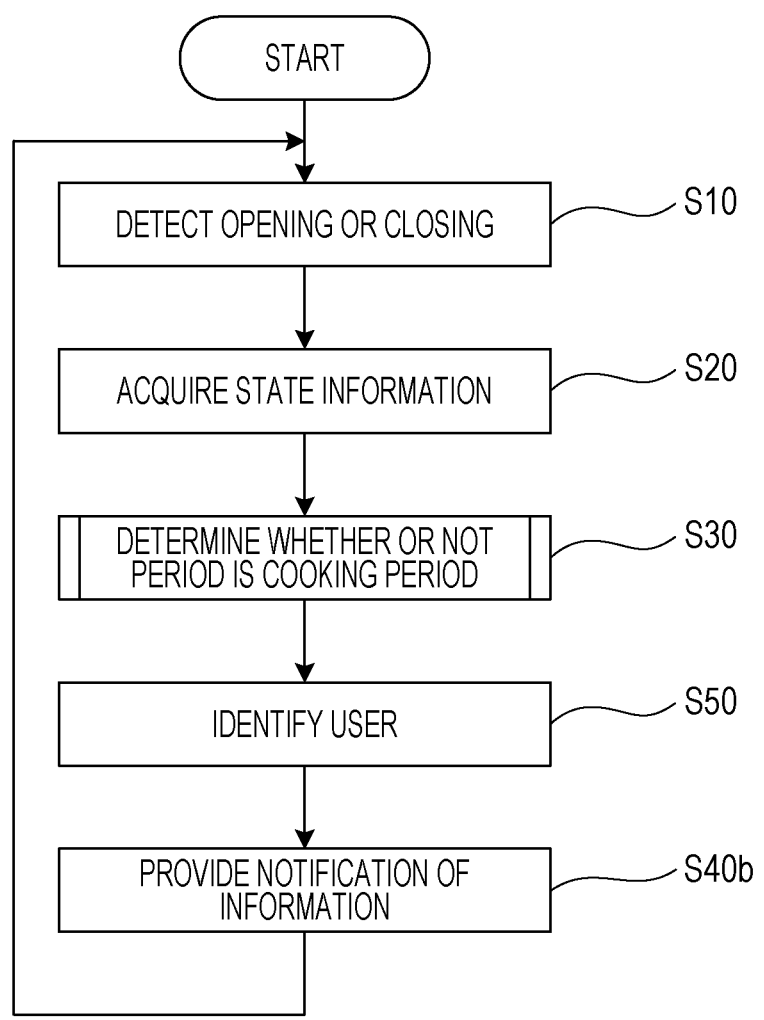
FIG. 11 is a flowchart describing processing which is performed in refrigerator in the third embodiment.

FIG. 11 is a flowchart describing the information delivery processing which is performed in the refrigerator 100b in the third embodiment.

The information delivery processing of the third embodiment differs from the information delivery processing of the first embodiment in that identification processing is added thereto and the notification processing of the information delivery processing of the first embodiment uses the result of the identification processing. Since the other processing is the same as the information delivery processing of the first embodiment, the explanation thereof will be omitted.

First, in the information delivery processing of the third embodiment, steps S10 to S30 in the information delivery processing of the first embodiment are performed.

After step S30, the identifying portion 170 identifies the user by at least one of the identification methods described above (S50).

Next, the notifying portion 130 notifies the user of the information in response to the determination result of the determining portion 150 and the identification result of the identifying portion 170 (S40b). That is, in step S50, if the identifying portion 170 identifies that the user who opened and closed the door/drawer 110 of the refrigerator 100b is a user A, the notifying portion 130 provides a notification of information for the user A, and, if the identifying portion 170 identifies that the user who opened and closed the door/drawer 110 of the refrigerator 100b is a user B, the notifying portion 130 provides a notification of information for the user B.

Incidentally, the identification processing in step S50 may be performed before the acquisition processing in step S20.

Moreover, after the identification processing in step S50 is performed, acquisition processing by which the acquiring portion 140 acquires the information for the user identified in the identification processing from the server 400 may be performed. In this case, after the acquisition processing, the notifying portion 130 provides a notification of the information acquired by the acquiring portion 140.

Hereinafter, a specific example of the identifying portion 170 will be described.

Specifically, the identifying portion 170 may detect the voice of a user and identify the user by using the detected voice. That is, the identifying portion 170 identifies the user by voice recognition. In this case, the identifying portion 170 identifies the user by comparing voice information indicating a voice related to each user in advance with the detected voice. The identifying portion 170 is implemented by, for example, a processor, memory in which a program and the voice information are stored, a microphone that picks up the voice of a user, and so forth.

In the identification processing which is performed by the identifying portion 170 in this case, first, a greeting, for example, is output from the speaker. The greeting is output in accordance with the current time, for example, and examples of the greetings are "Good morning" if it is in the morning and "Good afternoon", "Good evening", or the like if it is in the afternoon or evening. Then, if a reply such as a greeting given by the user by voice is made in response to the greeting output from the speaker, the identifying portion 170 detects the reply with the microphone and identifies the user.

Moreover, the identifying portion 170 may detect the position in the door/drawer 110 in which a user grasped the door/drawer 110 and identify the user who opened and closed the door/drawer 110 by using the detected position. In this case, the door/drawer 110 is a door of the refrigerator 100, and the identifying portion 170 detects the level at which a handle of the door was grasped and identifies the user by comparing level information indicating a level related to each user in advance with the detected level. The identifying portion 170 in this case is implemented by, for example, a processor, memory in which a program and the level information are stored, a sensor for detecting the position in the handle of the door in which the user grasped the handle, and so forth.

Moreover, the identifying portion 170 may detect the speed at which a user opened and dosed the door/drawer 110 (hereinafter referred to as the "opening-closing speed") and identify the user who opened and dosed the door/drawer 110 by using the detected opening-closing speed. Incidentally, the opening-closing speed is the speed which is observed when the door/drawer 110 is transitioned from one of the dosed state and the opened state to the other state by the user. In this case, the identifying portion 170 identifies the user by comparing speed information indicating the opening-closing speed related to each user in advance with the detected opening-closing speed. The identifying portion 170 in this case is implemented by, for example, a processor, memory in which a program and the speed information are stored, a sensor for detecting the opening-closing speed of the door/drawer 110, and so forth.

Furthermore, the identifying portion 170 may detect the face or silhouette of a user and identify the user by using the detected face or silhouette of the user. In this case, the identifying portion 170 identifies the user by comparing face information indicating an image or feature of a face or silhouette information indicating a silhouette, the face information or the silhouette information being related to each user in advance, with the detected face or silhouette of the user. Incidentally, if the identifying portion 170 identifies a user by detecting the silhouette of the user, the identifying portion 170 may detect the height of a user from the silhouette of the user and identify the user by using the detected height. The identifying portion 170 in this case is implemented by, for example, a processor, memory in which a program and the face information or the silhouette information are stored, a sensor such as a camera for detecting the face or silhouette of the user, and so forth.

Moreover, the identifying portion 170 may detect the weight of a user and identify the user by using the detected weight of the user. In this case, the identifying portion 170 identifies the user by comparing weight information indicating the weight related to each user in advance with the detected weight. The identifying portion 170 in this case is implemented by, for example, a processor, memory in which a program and the weight information are stored, a weight sensor for detecting the weight of the user, and so forth.

The identifying portion 170 may identify the user by using one of the identification methods described above or by arbitrarily combining the identification methods.

As described above, with the refrigerator 100b according to this embodiment, since the user who opened and closed the refrigerator 100*b* is identified and a notification of information in accordance with the user thus identified is provided, it is possible to prevent a notification of the redundant information from being provided to the user more reliably.

Moreover, with the refrigerator 100*b* according to this embodiment, if the user is already identified during the cooking period, when the opened state or the closed state of the door/drawer 110 is detected again during the same cooking period, it is possible to assume that one and the same person opened and closed the door/drawer 110 during the cooking period, which eliminates the need to perform identification processing again. As described above, since there is no need to perform the identification processing in the second and subsequent opened state or closed state of the door/drawer 110 during the same cooking period, it is possible to reduce the processing load on the information delivery processing. Furthermore, this makes it possible to reduce the power consumption.

(Fourth Embodiment)

Next, a fourth embodiment will be described.

Figure 12:
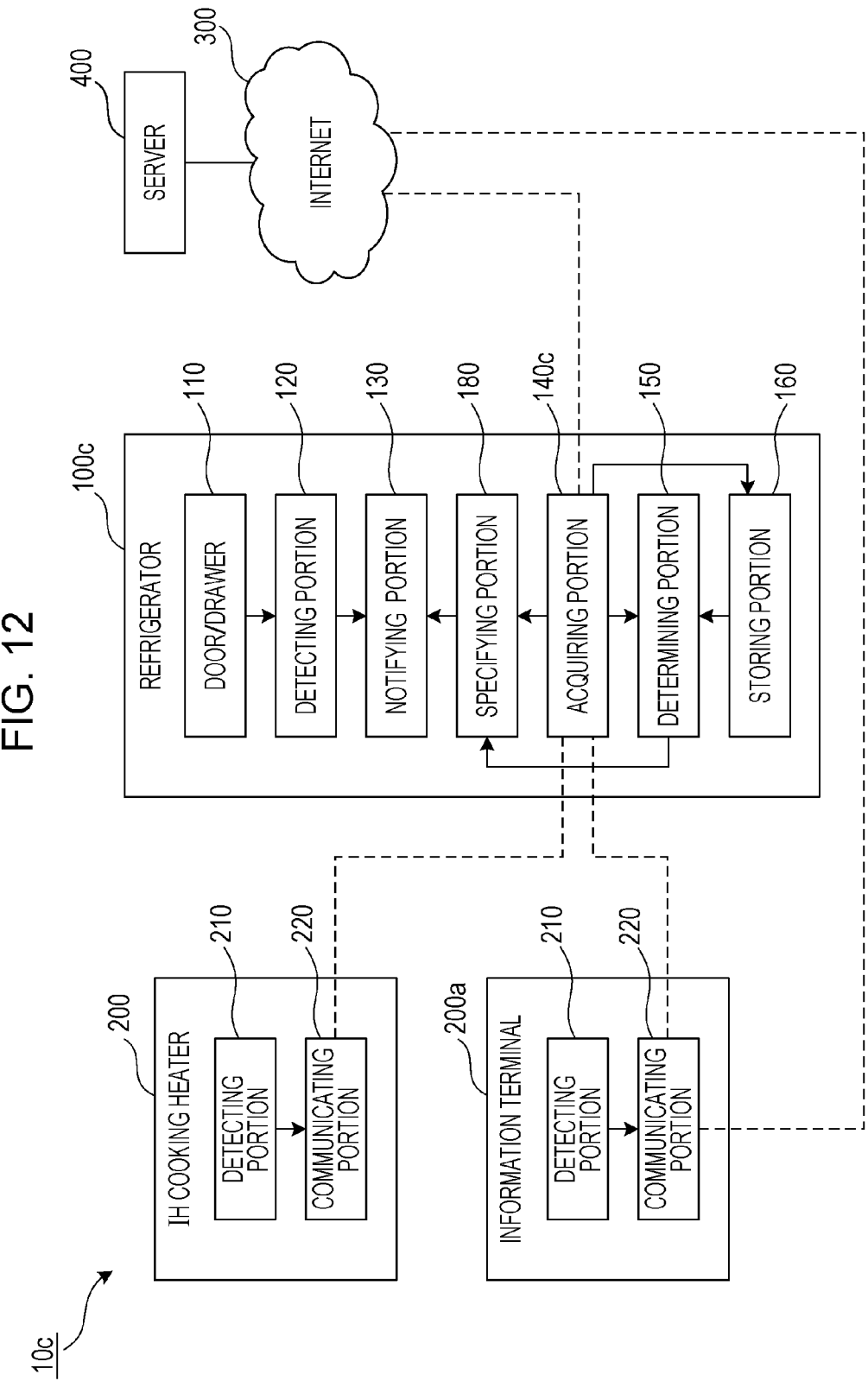
FIG. 12 is a block diagram depicting the configuration of an information delivery system in a fourth embodiment.

FIG. 12 is a block diagram depicting the configuration of an information delivery system 10*c* in the fourth embodiment.

The information delivery system 10*c* according to the fourth embodiment differs from the information delivery system 10*a* according to the second embodiment in that a refrigerator 100*c* further includes a specifying portion 180 and in the contents of processing which is performed by an acquiring portion 140*c*. Moreover, the information delivery system 10*c* according to the fourth embodiment differs from the information delivery system 10*a* according to the second embodiment in that the information delivery system 10*c* includes the other electrical apparatuses: the IH cooking heater 200 and the information terminal 200*a*.

Hereinafter, only the configuration which is different from the configuration of the refrigerator 100 of the second embodiment will be described.

The acquiring portion 140*c* acquires the state information from both the IH cooking heater 200 and the information terminal 200*a*. The state information which is acquired by the acquiring portion 140*c* is similar to the state information described in the first and second embodiments. Moreover, the acquiring portion 140*c* acquires a recipe of a recipe site which is being viewed on the information terminal 200*a*. Specifically, the acquiring portion 140*c* may acquire recipe information indicating the recipe from the information terminal 200*a* or acquire only a recipe ID for specifying the recipe information from the information terminal 200*a* and then acquire the recipe information from the server 400 based on the acquired recipe ID. The acquiring portion 140*c* acquires cooking procedures contained in the recipe by acquiring the recipe information.

The specifying portion 180 specifies a procedure of the cooking procedures obtained by the acquiring portion 140*c*, the procedure which is being performed, in accordance with the state information of the IH cooking heater 200 acquired by the acquiring portion 140*c*.

Next, information delivery processing which is performed in the refrigerator 100*c* according to the fourth embodiment will be described.

Figure 13:
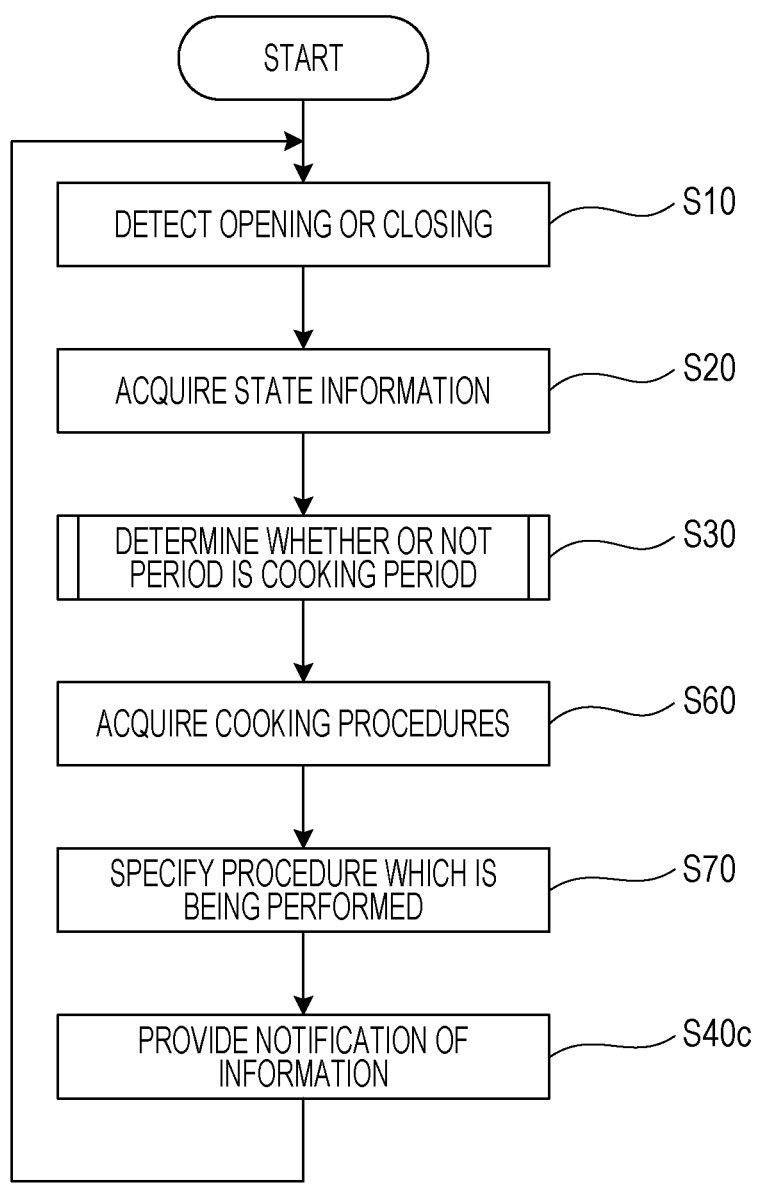
FIG. 13 is a flowchart describing information delivery processing which is performed in a refrigerator in the fourth embodiment.

FIG. 13 is a flowchart describing the information delivery processing which is performed in the refrigerator 100*c* according to the fourth embodiment.

The information delivery processing of the fourth embodiment differs from the information delivery processing of the second embodiment (that is, the processing obtained by changing the determination processing of the information delivery processing of the first embodiment to the determination processing depicted in FIG. 9) in that processing for acquiring cooking procedures and specification processing are added thereto and the notification processing of the information delivery processing of the second embodiment uses the result of the specification processing. Since the other processing is the same as the information delivery processing of the second embodiment, the explanation thereof will be omitted.

First, in the information delivery processing of the fourth embodiment steps S10 to S30 in the information delivery processing of the second embodiment are performed. Incidentally, in step S30, the determination processing of the first embodiment may be performed.

After step S30, the acquiring portion 140*c* acquires cooking procedures contained in a recipe of a recipe site displayed on the information terminal 200*a* (S60).

Next, the specifying portion 180 specifies a procedure of the cooking procedures acquired by the acquiring portion 140*c*, the procedure which is being performed, in accordance with the state information acquired by the acquiring portion 140*c* (S70).

Here, the specification processing in step S70, the specification processing being performed by the specifying portion 180, will be described in detail.

FIG. 14 is a diagram for explaining the specification processing which is performed by the specifying portion 180 of the refrigerator 100*c* according to the fourth embodiment. Specifically, FIG. 14(*a*) is a diagram depicting cooking procedures contained in a recipe which is acquired by the acquiring portion 140*c* and depicts a table in which a cooking procedure contained in the acquired recipe, an operation state (an expected state) of the other electrical apparatus corresponding to the cooking procedure, and an expected elapsed time (an expected time) are related to one another. FIG. 14(*b*) is a diagram depicting the current state information acquired by the acquiring portion 140*c* and, specifically, contains an elapsed time from the start of the operation (that is, from the start of the cooking period) to the present time and the current operation state.

The specifying portion 180 specifies a cooking procedure of the cooking procedures of FIG. 14(*a*), the cooking procedure corresponding to the state information, based on the state information depicted in FIG. 14(*b*). That is, in this case, the specifying portion 180 specifies a procedure 2 in which the operation state is "high heat" and the elapsed time is "12 minutes". Incidentally, in FIG. 14, the specifying portion 180 specifies a procedure of the cooking procedures based on both the elapsed time and the operation state, but the specifying portion 180 may specify a procedure of the cooking procedures based on any one of the elapsed time and the operation state.

Next, the notifying portion 130 provides a notification of information on a procedure following the procedure specified by the specifying portion 180 (S40*c*). In this case, specifically; the notifying portion 130 provides a notification of information on a procedure 3 following the procedure 2. That is, the notifying portion 130 provides a notification to the effect that, after a lapse of three minutes, a procedure in which pan-frying is performed for five minutes over "medium heat" of the next procedure 3 is performed.

With the refrigerator 100*c* according to this embodiment, since information on a cooking procedure which is performed next in cooking which is being done is provided, the user can get information on the next procedure in advance. This makes it possible to prevent the user from thinking about the next procedure with the door or the drawer of the refrigerator left open. As a result, it is possible to shorten the time for which the door/drawer 110 of the refrigerator 100c is opened and reduce the power consumption of the refrigerator 100c.

(Fifth Embodiment)

Next, a fifth embodiment will be described.

FIG. 15 is a block diagram depicting the configuration of an information delivery system 10d in the fifth embodiment.

The information delivery system 10d according to the fifth embodiment differs from the information delivery system 10 according to the first embodiment in the configuration of a refrigerator 100d and in that the information delivery system 10d further includes an information delivery device 500. Specifically, the information delivery system 10d according to the fifth embodiment differs from the information delivery system 10 according to the first embodiment in that the refrigerator 100d has a configuration obtained by removing the detecting portion 120, the notifying portion 130, the acquiring portion 140, and the determining portion 150 from the refrigerator 100 of the first embodiment and the refrigerator 100d includes the door/drawer 110. That is, the refrigerator 100d of the fifth embodiment is an existing refrigerator without the function of providing a notification of information.

Moreover, the information delivery device 500 includes the detecting portion 120, the notifying portion 130, the acquiring portion 140, and the determining portion 150 of the refrigerator 100 of the first embodiment. That is, the information delivery device 500 is a configuration obtained by separating, from the refrigerator 100 of the first embodiment, the configuration for implementing the function of providing a notification of information. Therefore, the component elements are the same as the component elements of the first embodiment and the explanations thereof will be omitted.

According to this embodiment, by installing the information delivery device 500, it is possible to implement the same function as the function of the refrigerator 100 of the first embodiment in the existing refrigerator 100d. As a result, the user can implement the same function as the function of the first embodiment by installing the information delivery device 500 without replacing the refrigerator with the refrigerator 100 of the first embodiment.

In the embodiments described above, the number of doors/drawers 110 is not mentioned, but the embodiments described above can also be applied to a refrigerator provided with a plurality of doors/drawers 110. In this case, the detecting portion 120 may detect the opened state or the closed state of a given door/drawer 110 of the plurality of doors/drawers 110 or may detect the opened states or the dosed states of all the doors/drawers 110. Incidentally, if the detecting portion 120 detects the opened states or dosed states of all the doors/drawers 110, the detecting portion 120 detects that any one of the doors/drawers 110 is opened and dosed.

Moreover, in the embodiments described above, the notifying portion 130 notifies the user of information by outputting voice from the speaker, but the notifying portion 130 does not necessarily have to provide a notification to the user by voice. For example, the notifying portion 130 may notify the user of information by providing a display portion such as a display in the refrigerator and performing display on the display portion.

Furthermore, in the embodiments described above, the notifying portion 130 provides a notification of different information every time the door/drawer 110 is opened or dosed as a predetermined notification made by regarding the user who opened or dosed the door/drawer 110 during the cooking period as one and the same person, but the example is not limited thereto. For example, in a refrigerator (for example, the refrigerator 100b of the third embodiment) which is configured to accept an input such as voice from the user and provide a notification in response to the input, a notification with consideration given to all the inputs and all the outputs which are accepted during the cooking period may be provided. Specifically, for example, if, after the user asks a question about the tomorrow's weather in this area and a reply "It'll be sunny", for example, is made, the user asks a question "The weather on the day after tomorrow?" during the same cooking period, the notifying portion 130 may provide a notification of the weather on the day after tomorrow by deciding that the user asked a question about the weather in this area on the day after tomorrow. In this case, if a reply is "it'll be sunny", there is a possibility that the same notification is provided even during the cooking period. That is, different notifications may not be provided every time the door/drawer 110 is opened or dosed during the same cooking period.

Moreover, in the embodiments described above, the notifying portion 130 provides a predetermined notification made by regarding the user as one and the same person in each cooking period, but the notifying portion 130 may provide a predetermined notification made by regarding the user as a specific one person during the cooking period, not in each cooking period. For example, if a user A is set in advance as a user who does cooking, the notifying portion 130 may provide a notification of information suitable for the user A during the cooking period.

In addition, in the first embodiment described above, only the IH cooking heater 200 is taken up as an example of the other electrical apparatus, but the example is not limited thereto, and the other electrical apparatus may be an electrical apparatus obtained by combining the household electrical appliances described in the first embodiment. That is, the determining portion 150 may determine the cooking period based on the operation state acquired from each of the household electrical appliances.

Incidentally, in the embodiments described above, each component element may be implemented by being configured by dedicated hardware or by executing a software program suitable for each component element. Each component element may be implemented as a result of a program executing portion such as a CPU or a processor reading and executing a software program stored in a recording medium such as a hard disk or a semiconductor memory. Here, the software that implements the information delivery device of each embodiment described above is the following program.

That is, this program makes a computer execute an information delivery method that detects an opened state or a closed state of at least one of a door and a drawer of a refrigerator, provides a notification of information when the opened state or the closed state is detected, acquires state information indicating an operation state of an electrical apparatus, determines whether or not the period is a cooking period in which cooking is being done by using the electrical apparatus based on the state information thus acquired, and provides, as the notification, a predetermined notification made by regarding a user who opened or closed the door or the drawer of the refrigerator as one and the same person if the opened state or the closed state is detected during the cooking period in the notification of the information.

As described above, a refrigerator according to one or more than one aspects has been described based on the embodiments, but the present disclosure is not limited to these embodiments. A mode obtained by modifying these embodiments in various ways of which a person skilled in the art can conceive and a mode constructed by combining the component elements in different embodiments may also be included in the one or more than one aspects within the spirit of the present disclosure.

The present disclosure is useful as, for example, a refrigerator control method that can prevent redundant processing from being performed when notifying the user of information.

What is claimed is:

1. A control method for controlling a refrigerator that is connected to one or more electrical apparatuses, the refrigerator including a processor and at least one of a door and a drawer, the control method causing the processor to:
   receive, from the one or more electrical apparatuses, state information indicating an operation state of the one or more electrical apparatuses, the one or more electrical apparatuses each being an electrical apparatus that is operable when a user is cooking;
   determine whether the user is cooking based on the received state information;
   identify a person and regard the person as the user while the user is cooking;
   detect, after identifying the person, a change in an opened state or a closed state of at least one of the door and the drawer;
   determine, each time the change in the opened state or the closed state is detected while the user is cooking, that the change in the opened state or the closed state is caused by the person regarded as the user without performing a subsequent identification; and
   output, to the user, through a speaker or a display, different information each time the change in the opened state or the closed state is detected, when the person is regarded as the user while the user is cooking,
   wherein the processor further determines whether the user is cooking in accordance with:
      a time at which an operation of one of the electrical apparatuses is started as indicative of a time at which the user starts cooking; and
      a time at which the operation of the one of the electrical apparatuses is ended or a time at which a predetermined time has elapsed after an end of the operation of the one of the electrical apparatuses as indicative of a time which the user ends cooking, and
   the one or more electrical apparatuses include at least one of an induction heating cooker, a lighting fixture, a ventilating fan, a microwave oven, an electric carpet, and a food processor.

2. The control method according to claim 1, wherein
   the refrigerator is further connected to a server that stores the information which is to be output to the user, and
   the control method further causes the processor to receive the information from the server.

3. The control method according to claim 2, wherein
   the control method further causes the processor to:
      receive a plurality of sets of the information and priority information indicating an order of output of the plurality of sets of the information from the server; and
      output, to the user, the different information each time the change in the opened state or the closed state is detected while the user is cooking in accordance with the priority information.

4. The control method according to claim 1, wherein
   the refrigerator is connected to a plurality of electrical apparatuses, and
   based on operation states of the plurality of electrical apparatuses.

5. The control method according to claim 1, wherein
   the one or more electrical apparatuses include an information terminal having a display,
   the processor determines that the user is cooking between a first time and a second time,
   the first time indicates when the processor receives first information, as the state information, indicating a start of displaying a cooking recipe on the display of the information terminal, and
   the second time indicates when the processor receives second information, as the state information, indicating an end of the displaying the cooking recipe on the display of the information terminal.

6. The control method according to claim 5, wherein
   the control method further causes the processor to:
      receive cooking steps contained in a recipe from an online site via the information terminal;
      specify a first cooking step of the cooking steps, the first cooking step which is being performed, based on the received state information; and
      output, to the user, information on a second cooking step which is a step following the specified first cooking step.

7. The control method according to claim 1, wherein
   the processor identifies the person while the person opens or closes at least one of the door and the drawer.

8. The control method according to claim 7, wherein
   the refrigerator includes a camera that takes an image of a face of the person, and
   the control method further causes the processor to:
      take an image of the face of the person using the camera; and
      identify the person by performing facial recognition processing on the image.

9. The control method according to claim 1, wherein when it is determined that the user is not cooking, same information is displayed even if the change in the opened state or the closed state is detected.

10. The control method according to claim 1, wherein
    the processor identifies the person using voice recognition.

11. The control method according to claim 1, wherein
    the processor identifies the person based on a position at which at least one of the door and the drawer of the refrigerator is grasped.

12. The control method according to claim 1, wherein
    the processor identifies the person based on a speed at which at least one of the door and the drawer of the refrigerator is opened or closed.

13. The control method according to claim 1, wherein
    the processor identifies the person based on one of a face, a silhouette, or a weight of the person.

14. The control method according to claim 1, wherein
    the processor determines the different information based on the person.

15. The control method according to claim 1, wherein
    the different information includes information on a cooking procedure which is performed next in cooking.

16. A refrigerator provided with at least one of a door and a drawer, the refrigerator comprising:

a processor; and a memory including instructions that, when executed by the processor, cause the processor to perform operations including:

acquiring state information indicating an operation state of an electrical apparatus, different from the refrigerator, connected to the refrigerator, and operable when a user is cooking;

determining whether the user is cooking based on the acquired state information;

identifying a person and regarding the person as the user while the user is cooking;

detecting, after identifying the person, a change in an opened state or a closed state of at least one of the door and the drawer;

determining, each time the change in the opened state or the closed state is detected while the user is cooking, that the change in the opened state or the closed state is caused by the person regarded as the user without performing a subsequent identification; and outputting, to the user, through a speaker or a display, different information each time the change in the opened state or the closed state is detected, when the person is regarded as the user while the user is cooking, wherein the processor further determines whether the user is cooking in accordance with:

a time at which an operation of one of the electrical apparatuses is started as indicative of a time at which the user starts cooking; and a time at which the operation of the one of the electrical apparatuses is ended or a time at which a predetermined time has elapsed after an end of the operation of the one of the electrical apparatuses as indicative of a time which the user ends cooking, and the one or more electrical apparatuses include at least one of an induction heating cooker, a lighting fixture, a ventilating fan, a microwave oven, an electric carpet, and a food processor.

17. A control method for controlling an information delivery apparatus that is connected to a refrigerator and to one or more electrical apparatuses, the refrigerator including at least one of a door and a drawer, each of the one or more electrical apparatuses being different from the refrigerator, the information delivery apparatus configured to output information to a user, wherein each of the one or more electrical apparatuses is an electrical apparatus operable when the user is cooking, the information delivery apparatus includes a processor, and the control method causes the processor to:

receive, from the refrigerator, opening-closing information indicating a change in an opened state or a closed state of at least one of the door and the drawer;

receive, from the one or more electrical apparatuses, state information indicating an operation state of the one or more electrical apparatuses;

determine whether or not the user is cooking based on the received state information;

identify a person and regard the person as the user while the user is cooking;

detect, after identifying the person, the change in the opened state or the closed state of at least one of the door and the drawer based on the received opening-closing information;

determine, each time the change in the opened state or the closed state is detected while the user is cooking, that the change in the opened state or the closed state is caused by the person regarded as the user without performing a subsequent identification process; and output, to the user, through a speaker or a display, different information every time the change in the opened state or the closed state is detected, when the person is regarded as the user while the user is cooking, wherein the processor further determines whether the user is cooking in accordance with:

a time at which an operation of one of the electrical apparatuses is started as indicative of a time at which the user starts cooking; and a time at which the operation of the one of the electrical apparatuses is ended or a time at which a predetermined time has elapsed after an end of the operation of the one of the electrical apparatuses as indicative of a time which the user ends cooking, and the one or more electrical apparatuses include at least one of an induction heating cooker, a lighting fixture, a ventilating fan, a microwave oven, an electric carpet, and a food processor.

* * * * *